(No Model.)  4 Sheets—Sheet 1.
J. H. FRENIER.
STONE SAWING MACHINE.
No. 315,608.  Patented Apr. 14, 1885.
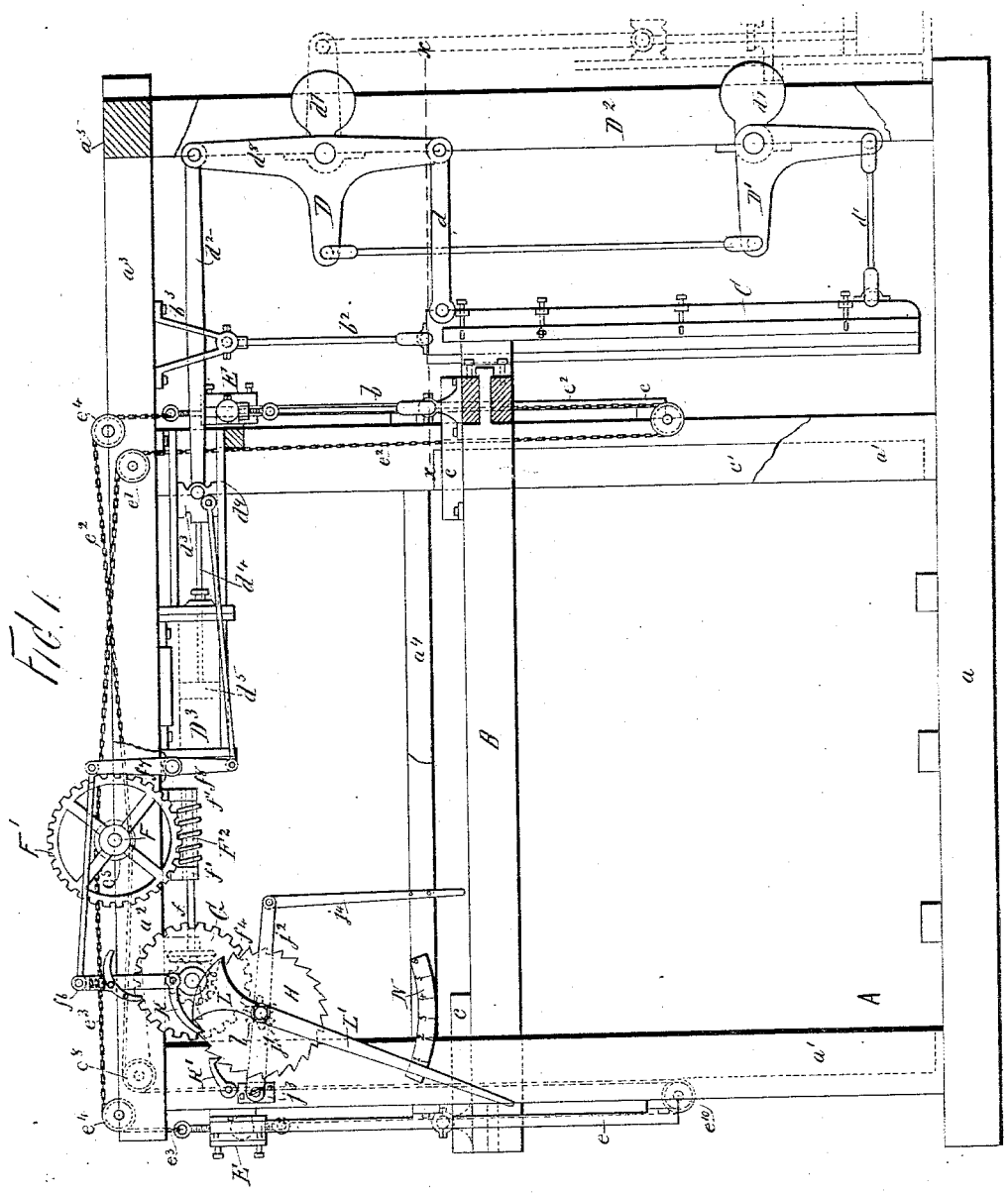

(No Model.)  J. H. FRENIER.  4 Sheets—Sheet 2.
STONE SAWING MACHINE.
No. 315,608.  Patented Apr. 14, 1885.
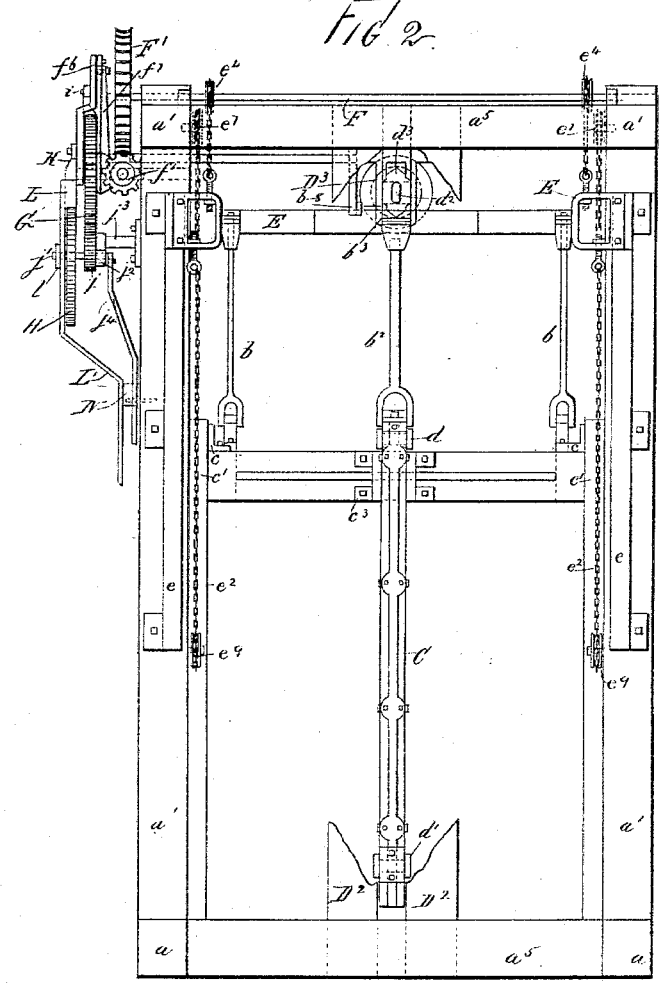

(No Model.) 4 Sheets—Sheet 3.
J. H. FRENIER.
STONE SAWING MACHINE.
No. 315,608. Patented Apr. 14, 1885.
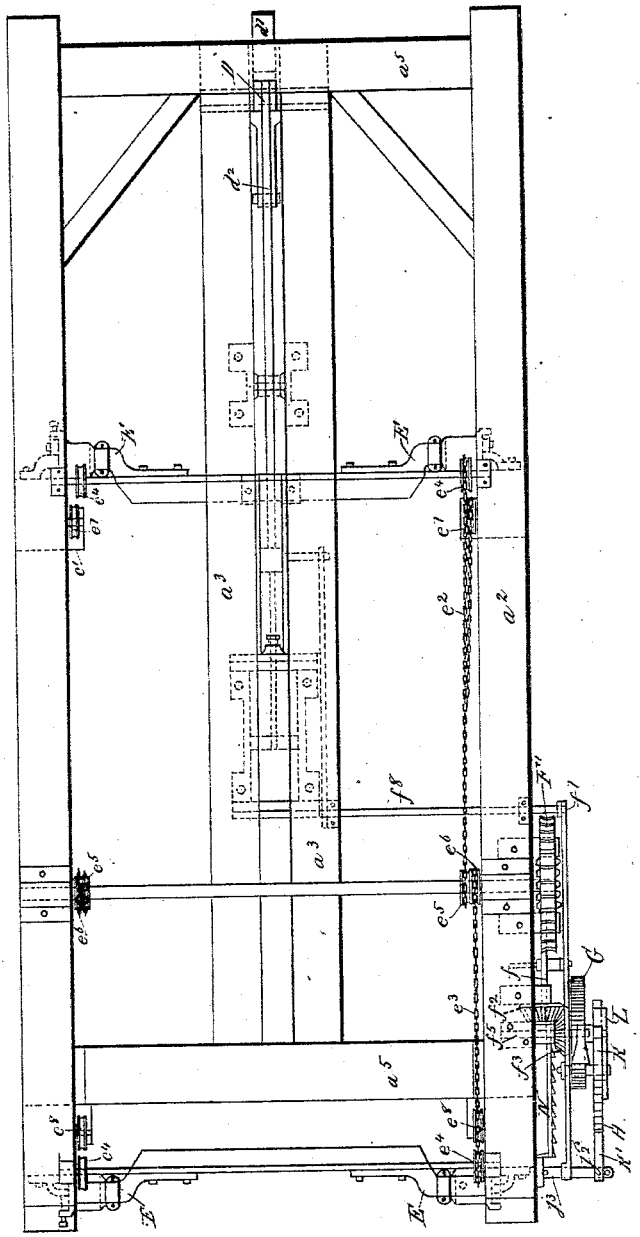

(No Model.) 4 Sheets—Sheet 4.
J. H. FRENIER.
STONE SAWING MACHINE.
No. 315,608. Patented Apr. 14, 1885.
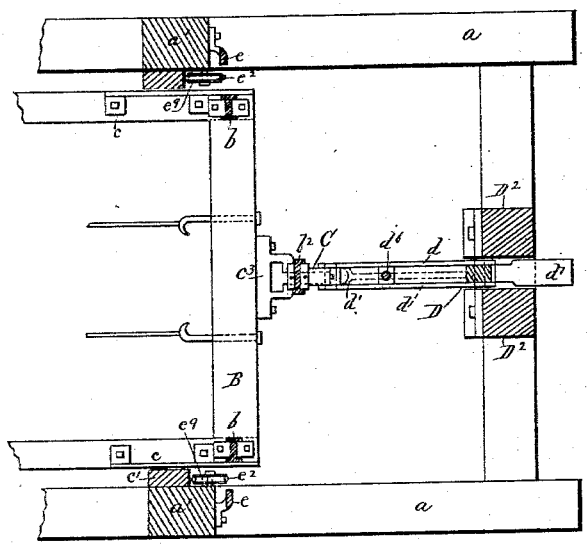
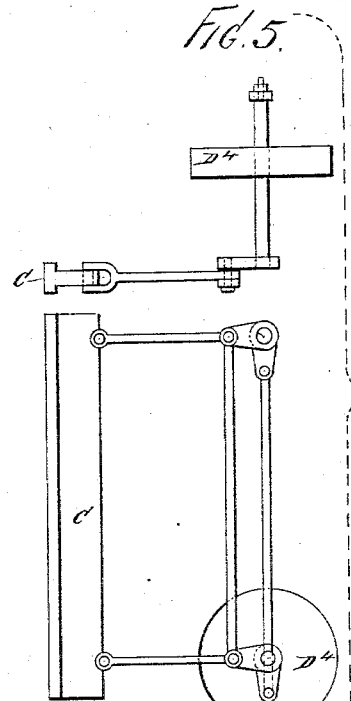
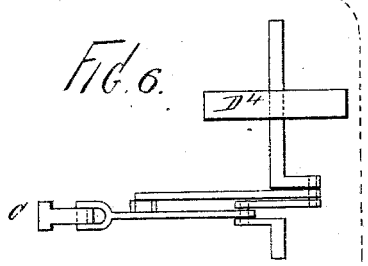
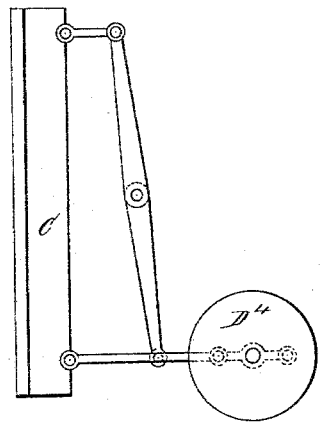
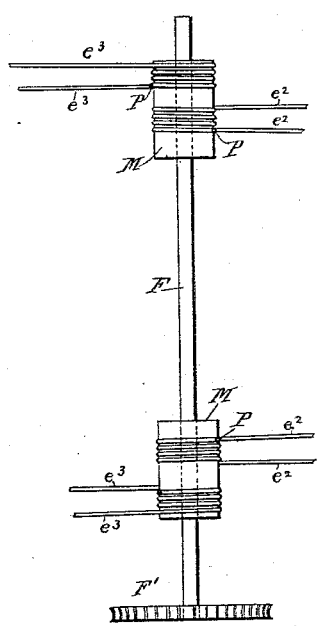
Witnesses:
John Buckler,
Henry Lieb.
John H. Frenier,
Inventor.
By Worth Osgood
Attorney.

UNITED STATES PATENT OFFICE.

JOHN HENRY FRENIER, OF RUTLAND, VERMONT.

STONE-SAWING MACHINE.

SPECIFICATION forming part of Letters Patent No. 315,608, dated April 14, 1885.

Application filed November 21, 1883. (No model.)

*To all whom it may concern:*

Be it known that I, JOHN HENRY FRENIER, a subject of the Queen of Great Britain, and a resident of Rutland, county of Rutland, and State of Vermont, have invented certain new and useful Improvements in Stone-Sawing Machines, of which the following is a full, clear, and exact description, reference being had to the accompanying drawings, and to the letters of reference marked thereon.

My invention has relation to that class of machines employed for sawing stone, and ordinarily known as "stone-sawing machines."

Among the objects of my invention are the production of a simple, cheap, compact, and durable machine wherein the saws may be moved rapidly, accurately, and smoothly, both for cutting and for adjusting them to position; the provision of means for uniformly moving the saw-frame, no matter what may be its height; the provision of efficient means for raising and lowering the saw-frame, for regulating the feed with accuracy and certainty, for indicating the degree of feed under which the saws are working; and, generally, to so arrange and distribute the various parts as to insure stability and obviate undue wearing and liability to damage or disarrangement while in use.

To accomplish all of this my improvements involve certain novel and useful arrangements or combinations of parts and principles of operation, all of which will be herein first fully described, and then pointed out in the claims.

Heretofore the saw-frame has ordinarily been reciprocated by a crank and connecting-rod, the crank-shaft working in stationary frame, and it has been customary, also, to mount the crank-shaft in an adjustable frame, both forms being disadvantageous—the first because the saw-frame is forced to take a general circular course about the crank-shaft, thus varying the motion of the saws at the expense of time, power, and cutting capacity, and the second because of the frequent and troublesome adjustments required to adapt the machine for cutting at different elevations. I obviate all this by mounting and moving the saw-frame in the manner below described.

In the accompanying drawings, forming part of this specification, Figure 1 is a side elevation, Fig. 2 an end elevation, and Fig. 3 a top or plan view, of a machine constructed and arranged for operation in accordance with my invention. Fig. 4 is a horizontal sectional view upon a plane passing through line $x\, x$ of Fig. 1. Figs. 5 and 6 represent each a plan and side elevation of an arrangement of mechanism which may be employed, instead of the arrangement indicated in Fig. 1, for communicating motion to the driving-bar. Fig. 7 is a plan view indicating one manner of applying ropes instead of chains, as in Figs. 1, 2, and 3, for raising or lowering the saw-frame. Fig. 8 is an elevation showing the adjustable pawl and its detent on a scale larger than in Fig. 1.

In all these figures like letters of reference, wherever they occur, indicate corresponding parts.

A is the main frame, composed of longitudinal sills, as $a\, a$, upright posts, as $a'\, a'$, acting as guides to the saw-frame, beams or plates, as $a^2\, a^3$, and cross-beams or girts, as $a^4\, a^5$, all fitted and connected in such manner as to insure the requisite stability.

B is the frame or sash, of any approved construction, for carrying the saw or saws, which are mounted or secured in any preferred way. The saw-frame works between the upright posts $a'\, a'$, being guided in its movements by suitable slides, $c$, attached to frame B, and moving in contact with slide-plates $c'$ upon the upright posts $a'$.

E E are cross heads made vertically adjustable, as will be hereinafter explained. The frame B is suspended from the cross-heads by the suspending-rods $b\, b$, connected with the cross-heads and saw-frame in any suitable way; or the frame may be supported or worked on wheels, rollers, or cams, or in any suitable way to permit or furnish the desired motion or lifting at each end of the stroke, according to the kind of saw used.

To reciprocate the saw-frame I employ a vertical driving-bar, C, (or more than one, if necessary,) the same being suspended or supported, essentially, by the same means which support or suspend the saw-frame, so as to insure the same degree of lifting motion at each end, as by a rod, $b^2$, made of same length as rods $b\, b$, as shown in drawings, sustained by the main frame, as by a bearing, $b^3$, and actuated by connections hereinafter explained. To insure accurate traveling of bar C it might be guided sidewise at top and bottom; but it will run very well without.

The saw-frame B is connected with bar C by means of a sliding block, $c^3$, the same being secured upon frame B and made movable up and down upon the bar C.

The bar C may be made of any durable material, as cast or wrought iron or steel, and may be of any suitable form of cross-section and fitted with any desired style of gibs.

The saw-frame, reciprocated by the bar C, may be raised or lowered at will, and will preserve a uniformity of movement at whatever height it may be worked, and thus secure the marked advantage of sawing stone of any thickness always with equal efficiency. If more than one bar C be employed, the saw-frame may be driven from the sides thereof instead of from the middle, as in the drawings. This might be desirable in case of an extra wide machine, or for other circumstance.

For actuating the slide-bar C, causing it always to preserve its vertical position, it is connected, as by rods $d\ d'$, with elbow-levers D D', mounted in suitable bearings secured upon post $D^2$, which might be of wood or metal of any required shape, and well secured and braced to the main frame, and also well connected with the engine, and these levers D D' are united by a rod, $d^6$, so as to compel them to move in unison, thus insuring perfectly parallel movements of bar C. I do not, however, limit myself to this particular means of moving bar C, for the same parallel motion may be secured by other arrangements, as by those indicated in Figs. 5 and 6, wherein the revolution of a crank-wheel, as $D^4$, will cause the bar C to move as required, as will be readily understood.

Upon levers D and D', Fig. 1, I apply counter-weights, as $d^7$, to balance the horizontal arms of the levers, as well as connecting-rod $d^6$. Upon one of the levers, as D, is a suitable arm, $d^8$, connected in this case by a rod, $d^2$, with a cross-head, $d^3$, moving in guides $d^9$, and secured to a piston-rod, $d^4$, actuated by a piston, $d^5$, in a cylinder, $D^3$. The piston may be driven by steam, water, air, or gas.

The cylinder is intended to be fitted with any suitable valve and valve motion, the kind used on steam-pumps being preferred, and is firmly secured at the top of the machine or at the back thereof, as indicated by dotted lines, Fig. 1, or in any other convenient location.

By connecting the piston and cross-head directly with lever D, substantially as indicated, I obviate the use of a crank-shaft and balance-wheel, thus greatly reducing the cost and weight of the machine, and by such connection I also dispense with belting and shafting such as is ordinarily employed with old forms of machines, thus effecting a considerable saving where only one machine is required. If more than one be required, they may all be driven by compressed air at a greatly-reduced expense compared with old methods; but in circumstances under which a belt would be more convenient to run the machine, instead of an engine, as shown, I reciprocate the elbow-levers D D' by means of a crank-shaft having a pulley fast to it, and the crank connected by a rod to lever-arm $d^8$, which is fastened to lever D in suitable position. This crank-shaft works in bearings mounted and located at same place as explained for the engine; also, any other mechanism which may be employed to drive bar C may be driven by belt, as mechanism shown in Figs. 5 and 6.

The object in locating the engine or the crank-shaft as above explained is to secure compactness and simplicity of structure; but many other means of driving the vertical bar C may be devised or selected, or any kind of engine could be used, and, so far as that bar is concerned, I do not limit myself to such an arrangement of the engine. The arrangement is, however, advantageous in this respect, that it can be applied upon many old forms of machines without material alteration of parts.

By shortening the machine I am enabled to place it upon a single bed-plate, thereby insuring great strength, and in many instances making it portable, and always economizing room in the mill.

For raising and lowering the saw-frame B, the cross-heads E are made to slide vertically on suitable guides, $e$, secured to posts $a'\ a'$, and are attached to chains or ropes $e^2\ e^3$, passing over pulleys $e^4$, applied upon the main frame. The chains are carried to chain-wheels $e^5\ e^6$, provided with teeth or notches suitable for holding the particular pattern of chain employed, chain $e^2$ being made to pass under wheel $e^5$, then back on top and over pulley $e^7$, then down under pulley $e^9$, then up to cross-head E, while chain $e^3$ passes over wheel $e^6$, back under to pulley $e^8$, down to $e^{10}$, then up to cross-head E. Both chains are made adjustable as to length and tension by use of eye-bolts, by means of which they are connected with the cross-heads. The chains on each side of the machine are similarly arranged. The wheels $e^5$ and $e^6$ are fastened upon a cross-shaft, F, so that as the latter is rotated the saw-frame is raised or lowered, (according to the direction of rotation of shaft F,) and is uniformly elevated or lowered at all points. When ropes are employed instead of the chains, I use rope-drums, (grooved drums being preferred,) as at M in Fig. 7. The drums are attached to cross-shaft F, and from them the ropes lead the same as the chains above explained; but the ropes are wound around the drums a sufficient number of times so as to always have upon the drums a length of rope at least equal to the height of blocks required to be sawed, and they are made fast to the drums, as at points P, which are about midway of the wound portions when the saw-frame is at about the middle of the stone block.

The fastenings are for the purpose of preventing any slipping. The advantage of this arrangement is that by having the cross-heads drawn by chains or ropes on both sides the frame B is forced downwardly as well as upwardly, and this permits the machine to be operated rapidly and without noise.

In old forms of machines wherein the cross-heads are simply suspended from above, when it is required to lower the saws into cuts partly finished, it frequently happens that one side of the frame becomes retarded from some cause, and the other side continues to lower, resulting in crowding, breakage, and much trouble, also when the machine is run rapidly the frame is permitted to rise more than intended, resulting in pounding vibrations and breakage of the chains or ropes, all of which is avoided by forcing and holding the saw-frame down as well as up. This part of my invention might be accomplished by the use of screws or means other than the ropes or chains, and I do not, therefore, limit myself to their use for this particular purpose. This manner of moving the saw-frame might be applied to machines which are not provided with other separate features of my invention.

At F' is a worm-wheel keyed upon shaft F, said wheel being driven by an endless screw, $F^2$, upon a horizontal shaft, $f$, movable in suitable bearings, $f'$, upon the main frame.

Upon the shaft $f$ is a bevel-gear, $f^2$, meshing with a similar gear, $f^3$, connected with the gear-wheel G, and turning on a shaft or stud, $f^4$, in a suitable bearing, $f^5$, upon the main frame.

Upon the end of shaft $f^4$ is a rocking lever, $f^6$, made to reciprocate by any suitable means, in this case connected with rock-lever $f^7$, the opposite end of which, $f^8$, is united with cross-head $d^3$, as shown, or with any other point or part capable of affording the same movement. The rocking lever $f^6$ has a double pawl, $i$, mounted thereon, made to engage with the gear or ratchet wheel G by lowering it; or it may be lifted out of engagement by an arm, $g$, or other means, and held out of contact by a movable detent, $g'$, having a notch fitting the angular head of the pawl, and held in place by a spring, $g^2$, being made movable in its bearing $g^3$, mounted upon lever $f^6$. A pinion, $j$, engages with gear G, said pinion moving on a stud, $j'$, fast to a lever, $j^2$, which is fulcrumed upon a suitable bracket, $j^3$, fastened to a frame, A, and provided at its opposite end with an arm, $j^4$. The lever $j^2$ is made movable for the purpose of bringing the pinion $j$ into or out of gear with G. A ratchet-wheel, H, fast to pinion $j$ and turning on the same stud, is worked by a pawl, K, connected with lever $f^6$. K' is a retaining-pawl for preventing back motion in H.

When it is desired to raise or lower the saws rapidly, either for adjusting the saws to the stone to commence the cut, or for raising them after the sawing is finished, or for any other purpose, the pinion $j$ is lowered by means of arm $j^4$. The pawl $i$ is then brought into engagement on one side or the other, accordingly as it is desired to raise or lower the saw-frame B, and as the pawl compels the wheel G to turn the requisite rapid movement will be communicated to the saw-frame.

For feeding the saws into the cut a slower movement is required, and for this I employ the feeding mechanism below mentioned, first throwing pawl $i$ out of engagement and elevating wheel H, so that its pinion shall mesh with wheel G.

The ratchet-wheel H, lever $f^6$, and pawl K operate to produce a regular downward feed at each stroke of the piston or saw-frame, and this feed is regulated according to the quality of the stone, or other circumstances, by an adjustable slide or cover, L, turning on stud $j'$, being held by nut $l$ with sufficient friction to maintain it in any place to which adjusted. As the cover L is moved one way or the other, the pawl K is permitted to skip or engage a greater or less number of teeth upon ratchet-wheel H, according to its adjustment, so as to regulate the feed, and by placing it (the cover) at a certain position it will entirely prevent the pawl K from moving the ratchet-wheel.

An arm, L', connected with the cover L, serves as a convenient means of effecting the adjustments, and also as a pointer, in connection with a graduated scale plate or arc, N.

By observing the position of the pointer over the scale the operator is enabled at a glance to determine the degree of feed under which the saws are working, and thus the operation of regulating the feed greatly facilitated.

The feed may be regulated or altered when the machine is in motion as well as when it is stationary. This arrangement affords means for accurately regulating the feed, and possesses various advantages over old feeding devices, wherein no means has been provided for exhibiting the degree of feed to the operator.

The machine, constructed and arranged for operation substantially in accordance with the foregoing explanations, will be found to admirably answer the several purposes or objects of the invention as above set forth.

I am aware that a vertical bar has heretofore been applied in a stone-sawing machine, said bar being suspended by pendulum-rods and operated by connections with the main crank or shaft; but I am not aware that the saw-frame has ever heretofore been mounted upon said bar and guided in its up-and-down movements directly on said bar, as in my invention herein shown.

Having now fully described my invention, what I claim as new, and desire to secure by Letters Patent, is—

1. In a stone-sawing machine, the combination of a fixed main frame, a vertically-adjustable saw-frame, one or more vertical bars having a path of travel which is constant in elevation, one or more sliding pieces, $c^3$, fast to said saw-frame and movable up and down upon said bar or bars, the levers or arms connected with said vertical bar or bars for imparting motion thereto, and the endless chains or ropes connected with the upper and lower sides of the cross-heads, substantially as and for the purposes set forth.

2. In a stone-sawing machine, the combination, with a fixed main frame, of one or more vertical bars working in a path of travel which is fixed or constant in elevation, a vertically-adjustable saw-frame sliding or movable upon said bar or bars, and pendulum-rods of equal lengths to support the saw-frame and the vertical bar or bars, substantially as described, and for the purposes set forth.

3. In a stone-sawing machine, the combination, with a fixed main frame, of one or more vertical bars working in a path of travel which is fixed or constant in elevation, a vertically-adjustable saw-frame sliding upon said bar or bars, pendulum-rods of equal lengths to support the saw-frame and the vertical bar or bars, substantially as described, a motor arranged substantially as specified, and secured on the main frame and mechanism between the said motor and the vertical bar or bars, which imparts to the said bar or bars a reciprocating movement, substantially as explained, and for the purposes set forth.

4. The combination, in a machine for sawing stone, of a vertical bar, C, supported by the swinging rod $b^2$, mounted in stationary bearings, means to impart a reciprocating movement to said bar, the saw-frame B, sliding vertically upon bar C, said saw-frame being suspended by rods $b\ b'$, made of the same length as rod $b^2$, and means for adjusting and maintaining said saw-frame in close sliding contact with bar C, substantially as described, and for the purposes set forth.

5. The combination, in a stone-sawing machine, of a reciprocating saw-frame, B, pendulum-rods $b\ b'$, cross-heads E E, feed-shaft F, wheels or drums $e^5\ e^6$, fast to said shaft F, the upper supporting-wheels set above the cross-heads, the lower wheels, $e^9\ e^{10}$, below the cross-heads, and the endless chains or ropes connected to the upper and to the lower side of said cross-heads E E, and all said chains or ropes operated by wheels $e^5\ e^6$, substantially as described, and for the purposes set forth.

6. The combination, in a stone-sawing machine, of the ratchet-wheel operated by a pawl, the adjustable cover or shield covering part of said ratchet-wheel and made adjustable to regulate the engagement of the pawl therewith, substantially as explained, and a stationary scale or index, in combination with said adjustable cover for indicating the rapidity of the downward feed of the saws, substantially as described, and for the purposes set forth.

7. In a feeding mechanism for stone-sawing machines, the combination of the ratchet-wheel H, pawl K, rock-lever $f^6$, for operating the same, an adjustable cover or shield interposed between the pawl K and said wheel H, the handle or lever L', applied in connection with said cover, and the holding-nut $l$, for maintaining the cover at any point to which adjusted, substantially as shown, and for the purposes set forth.

8. The combination, in a machine for sawing stone, of the vertical bar or bars arranged to impart movement to the saw-frame, substantially as described, said saw-frame being movable upon said bar or bars, pendulum-rods to suspend said saw-frame and the said vertical bar or bars, all the said rods being made of the same length in order to impart to the saw-frame and the vertical bar or bars like motion throughout the stroke, and the mechanism for operating the said vertical bar or bars, substantially as explained, and for the purposes set forth.

9. In a stone-sawing machine, the combination of the ratchet feed mechanism for producing an intermittent downward feed, substantially as explained, the reversing feed mechanism, the saw-frame B, means of suspending or supporting the saw-frame, a driving-bar, C, supported by the same means, and an index for indicating the rapidity of the downward feed in the stone, substantially as set forth.

10. In a stone-sawing machine, the combination of a main frame, A, a separate vertically-moving reciprocating saw-frame, B, a vertical driving-bar, C, connected with the saw-frame and supported or suspended by the same means in order to take up the same motion throughout the stroke, the chains or ropes for moving the saw-frame, feeding mechanism for feeding said frame downwardly, and a cover or shield for the ratchet-wheel to regulate the extent of feed, substantially as set forth.

11. In a stone-sawing machine, the combination, with a main frame, of a separate moving saw-frame, B, means to support or suspend said saw-frame, means to adjust it vertically, and a separate vertical drive-bar, C, connected to the saw-frame by piece $C^3$, fast to the saw-frame and sliding upon bar C in its movement up and down, said bar C suspended by the rod $b^2$, made of the same length as rods $b\ b'$, so as to cause said bar C to rise at each end of the stroke, the same as the saw-frame B, said rod $b^2$ working in stationary bearing $b^3$, elbow-levers D D', rods $d\ d'$, rod $d^6$, post $D^2$, and rod $d^2$, connecting with the motor, the several parts being arranged and combined substantially as described.

12. In a stone-sawing machine, the combination of the saw-frame B, supported by pendulum-rods, a vertical bar, C, suspended by a rod or rods working in stationary bearings, said saw-frame connected with and made to move up or down upon said bar C, mechanism to transmit motion to said bar C, means to impart to it a reciprocating motion, means to raise or lower the saw-frame, a ratchet feed mechanism having a cover or slide adjustable over said ratchet-wheel to regulate the engagement of the pawl therewith, and a stationary scale or index to indicate the rapidity of the downward feed, substantially as and for the purposes set forth.

In testimony that I claim the foregoing I have hereunto set my hand in the presence of two witnesses.

JOHN HENRY FRENIER.

Witnesses:
P. H. BRASSORD,
F. W. HUDSON.